United States Patent [19]

Yamazaki

[11] 4,005,832

[45] Feb. 1, 1977

[54] STRUCTURE RELATING TO BAIL ARM OF SPINNING REEL FOR FISHING

[75] Inventor: Tatsuya Yamazaki, Fuchu, Japan

[73] Assignee: Ryobi, Ltd., Fuchu, Japan

[22] Filed: July 14, 1975

[21] Appl. No.: 595,854

[30] Foreign Application Priority Data

Sept. 9, 1974 Japan .................... 49-108979[U]

[52] U.S. Cl. .................................. 242/84.21 R
[51] Int. Cl.² ................................ A01K 89/02
[58] Field of Search .................... 242/84.21 R

[56] References Cited

UNITED STATES PATENTS

| 2,974,895 | 3/1961 | Wood | 242/84.21 R |
| 3,797,774 | 3/1974 | Dumbauld | 242/84.21 R |

FOREIGN PATENTS OR APPLICATIONS

| 957,937 | 2/1950 | France | 242/84.21 R |
| 430,909 | 2/1948 | Italy | 242/84.21 R |
| 546,274 | 7/1956 | Italy | 242/84.21 R |

Primary Examiner—Harry N. Haroian
Assistant Examiner—John W. Shepperd

[57] ABSTRACT

A structure in which a bail arm assembly consists of a bail arm, a bail arm cam and an arm supporting plate. The bail arm is energized to turn in the direction of the arm folded position. The reverse side of the bail arm cam is butted against by a kick lever projected out through an opening of the peripheral wall of a rotor. The bail arm cam has at its circumferential edge a recess for receiving the outer end of the kick lever when the arm is retained in the line detaching position and at its reverse side a protuberance for engaging with the same outer end when the arm is retained in the line holding position. The engagement between the protuberance and the outer end of the kick lever is released by pushing down the kick lever through an operating button portion thereof, whereby the bail arm can be folded down to one side of the reel body.

3 Claims, 5 Drawing Figures

STRUCTURE RELATING TO BAIL ARM OF SPINNING REEL FOR FISHING

SUMMARY OF THE INVENTION

This invention relates to an improved structure relating to the bail arm of spinning reel for fishing.

In the conventional fishing reels, a bail arm is pivotally secured to the peripheral wall of a rotor so that the arm stays projected toward the outer periphery of the rotor either when the arm is in the line holding position or in the line detaching position. Therefore, the volume of the reel as a whole is inevitably enlarged and when the reel is packed, there is required a case large enough to cover the projected arm portion. Further, there is a possibility that the arm be bent or damaged during encasing or carriage by an angler.

An object of the present invention is therefore to fold down a bail arm to one side of the body so that the arm is protected against external impact, bending and other damage when the reel is not used.

Another object of the invention is to fold down the arm by a simple operation of merely pushing down a bail arm operating button portion of a kick lever.

Still another object of the invention is to reduce the volume of the entire reel to facilitate packing and carriage of the reel.

Further object of the invention is to set with ease in either the line holding position or the line detaching position from the folded down position by simply turning the arm against elasticity of a spring, with no need of pushing down the kick lever.

Other objects and advantages of the invention will be apparent from the following description taken in conjunction with the accompanying drawings:

BRIEF DESCRIPTION OF THE INVENTION

DETAILED DESCRIPTION OF THE INVENTION

Figure 1:
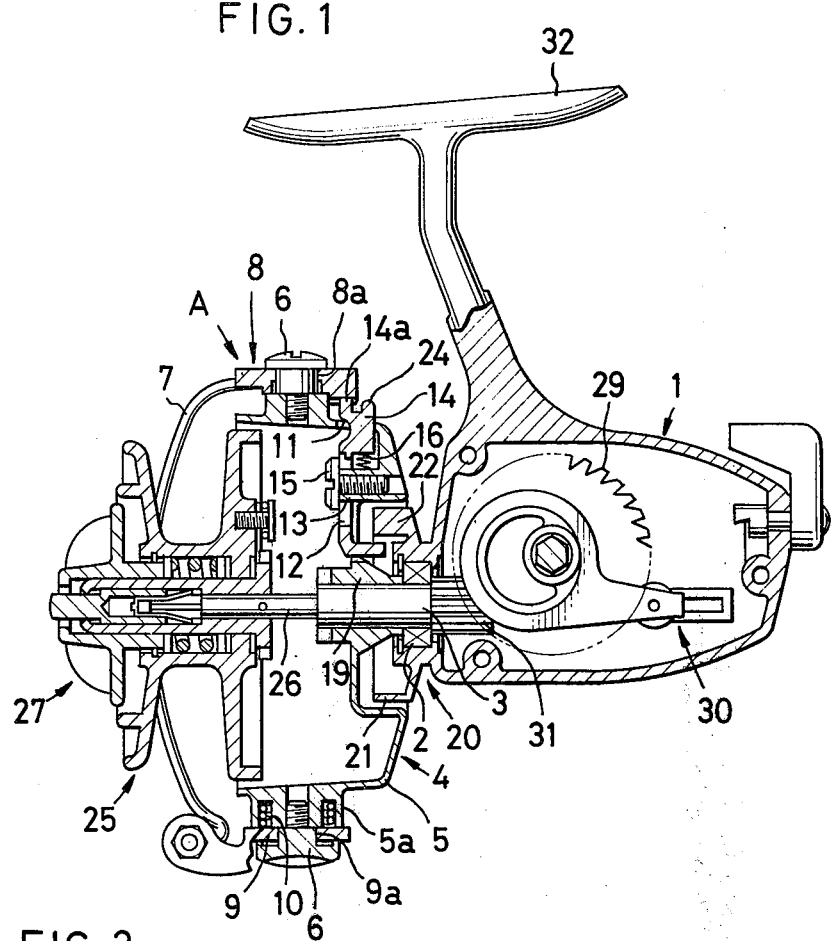
FIG. 1 is a longitudinal sectional view of a spinning reel according to the present invention.
Figure 2:
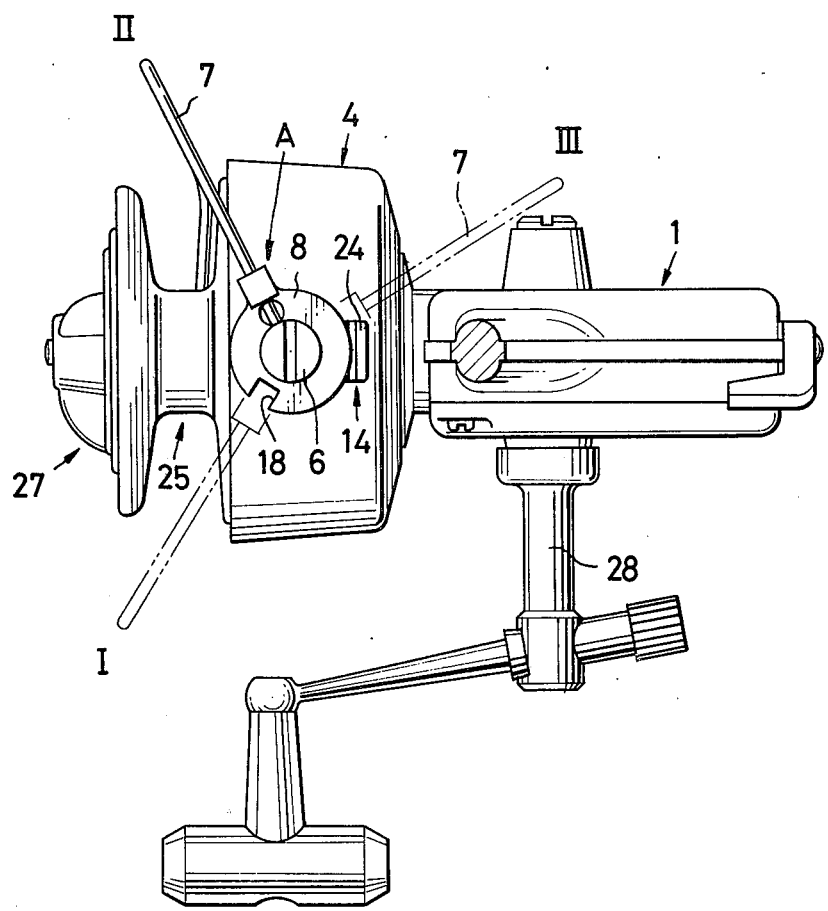
FIG. 2 is a plane view of the spinning reel, with parts broken away.

Referring to FIG. 1, a bail arm A is pivotally secured by screws 6 to the outer peripheral wall 5 of a rotor 4 which is rotatably supported to the body 1 by means of a tubular shaft 3 through bearing 2. The bail arm A includes a bail arm cam 8 and an arm supporting plate 9 carrying a line catch (not shown), to which both ends of an arm 7 are respectively secured. The both cam 8 and supporting plate 9 are respectively formed with tapped holes 8a, 9a into which the screws 6 are threadedly secured to connect them to the opposite side of the rotor peripheral wall 5. There is provided under the supporting plate 9 with a first coil spring 10 having its ends secured to the supporting plate and to a spring seat 5a raised up from the rotor peripheral wall, thereby normally forcing the bail arm A to turn in the direction from the line detaching position I to the line holding position II and further to the arm-folded position III (see FIG. 2).

Under the bail arm cam 8, there is provided with an opening 11 formed in the peripheral wall 5 of the rotor, from which one end of a kick lever 14 provided to the bottom of the rotor projects out. The kick lever 14 has a longitudinally elongated slot 12 in its main body in which a tubular short shaft 13 extended from the bottom of the rotor 4 is freely fitted. A screw 15 is threadedly secured to a hole provided in the shaft 13 to prevent the kick lever from coming off. A second spring 16 is interposed between the shaft 13 and a downward stepped portion 17 formed at an upper part of the kick lever 14, thereby to energize the kick lever to move slidably and outwardly.

The kick lever 14 is provided at the upper and outer end thereof with a butting portion 14a which butting end against the reverse side of the cam 8 by dint of the spring 16. The bail arm cam 8 is provided at its circumferential edge with a recess 18 adapted to receive the butting portion 14a of the kick lever when the bail arm A is retained in the line detaching position I after turned against the elastic force of the spring 10.

Figure 5:
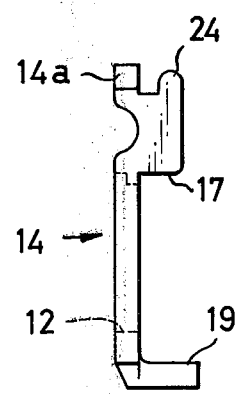
FIG. 5 is a front view of a kick lever.

As shown in FIGS. 1 and 5, the lower end of the kick lever is bent sidewise to form a cam follower 19. The outside of a bearing portion 20 of the body 1 is formed into an open cylinder 21 the inner surface of which is actuated as a cam 22 which come in contact with and press down the follower 19 rotated along with the rotor 4, thereby to move the kick lever 14 down against the elastic force of the spring 16 and disengage it from engagement with the recess 18.

Figure 3:
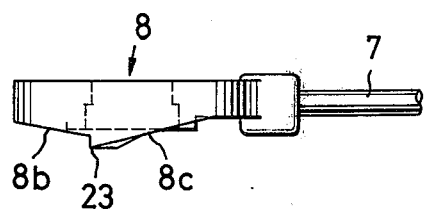
FIGS. 3 and 4 show a bail arm cam, FIG. 3 being a front view and FIG. 4 being a rear view.
Figure 4:
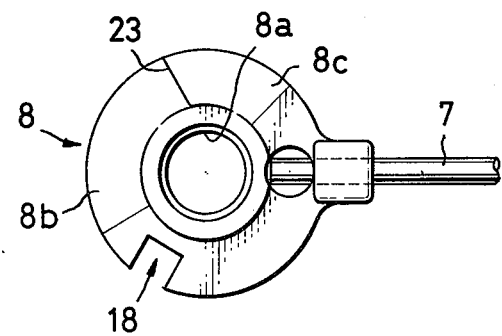

As shown in FIGS. 3 and 4, on the reverse side of the cam 8, there is provided a protuberance 23 which is suitably spaced-apart circumferentially from the recess 18 and adapted to retain the bail arm A in the line holding position II by an engagement of the protuberance with the butting portion 14a of the kick lever 14. The kick lever 14 has at its outer end adjacent to the butting portion 14a an operating button portion 24 which is adapted to press down the kick lever 14 against the elastic force of the spring 16 to release the butting portion 14a from the protuberance 23.

Since the spring 10 is so arranged as mentioned before that the arm 7 may turn from the line detaching position I to the arm-folded position III with passing over the line holding position II, when the engagement between the protuberance 23 and the butting portion 14a of the kick lever is released, the bail arm A is turned to the last position III such that the arm 7 is folded.

In this embodiment, the bail arm cam 8 may be further provided on its reverse side with a first sloping face 8b gently declining circumferentially from one side of the recess 18 toward the protuberance 23 formed by a stepped portion pending down from the lower terminal of the face 8b, and a second sloping face 8c which now rises up steeply from the lowermost end of the protuberance to the flat face near the attached end of the arm 7. According to this arrangement, turning of arm cam 8 from the arm-folded position to the line holding position, or from the line holding position to the line detaching position, can be accomplished without need of pushing down the operating button portion 24 of the kick lever 14 due to the presence of the sloping faces 8b, 8c formed rising up on both sides of the protuberance 23.

Referring again to FIG. 1, numeral reference 25 indicates a spool which is fixed by a drag-knob mechanism 27 to a main shaft 26 slidably fitted with the tubular shaft 3. It is arranged that the main shaft is slidable through a reciprocation mechanism 30 coupled through a suitable power transmission mechanism with a main gear 29 which is turned by rotation of a handle shaft 28 supported to the body 1. The rotor 4 is rotated by a main gear turn drive mechanism that the main gear is meshed with a pinion 31 on the tubular shaft 3, whereby the fishline caught by the line catch provided on the arm supporting plate 9 is wound up on the spool 25. Numeral reference 32 shows a rod receiver carried by the body 1.

What is claimed is:

1. A spinning reel for fishing having a body and a rotor with a bail arm structure comprising:
   a bail arm;
   a bail arm cam and an arm supporting plate supporting respective upper and lower ends of said bail arm on the peripheral wall of said rotor, said cam and plate being mounted on opposite sides of the peripheral wall of said rotor;
   a first spring coupled between said rotor and one end of said bail arm and applying a torque to force said bail arm to move toward a folded position adjacent the body of the spinning reel;
   means defining an opening formed in the peripheral wall of said rotor under said bail arm cam, said bail arm cam having a cam surface facing inwardly of said rotor;
   a kick lever having a longitudinally elongated slot in its main body and a fastener extending through said slot and connected to said rotor;
   said slot and fastener slidably supporting said kick lever on said rotor, said kick lever having its outer end extending through said opening and having a butting portion at the upper end of said kick lever and an operating button portion at its outer end;
   a second spring urging said end of said kick lever to project outwardly through said opening and against the cam face of said bail arm cam, said cam face having a recess at its peripheral edge and a protuberance circumferentially spaced from said recess, said kick lever outer portion latching in said recess when said bail arm is in a line detaching position, said kick lever outer portion engaging said protuberance when said bail arm is in an operating position, said kick lever outer portion being releasable from engagement in said recess and with said protuberance by actuation of said kick lever against the biasing force of said second spring to thereby return said bail arm to the folded position upon depression of said operating button portion; and
   wherein said kick lever has a cam follower portion extending sideways from the lower end thereof and engageable with a release cam on the body of the spinning reel, said cam follower engaging said release cam on the main body of the spinning reel to thereby effect movement of said kick lever against the bias of said second spring sufficient to release said outer end portion from said recess and thus effect movement of said bail arm from said line detaching position to said operating position.

2. The spinning reel according to claim 1, wherein:
   the cam face of said bail arm cam faces inwardly of said rotor; and
   said protuberance is formed by a stepped portion pending downwardly from the lower terminal portion of a first sloping face to the lower terminal portion of a second sloping face.

3. The spinning reel according to claim 2, wherein:
   said first sloping face gently slopes downwardly circumferentially from one side of said recess to the upper end of said protuberance, and said second sloping face rises steeply from the lowermost end of said protuberance to a flat face portion near the end of said bail arm that is attached to said bail arm cam.

* * * * *